United States Patent [19]

Chung et al.

[11] Patent Number: 5,200,274
[45] Date of Patent: Apr. 6, 1993

[54] PROCESS FOR SURFACE-MODIFYING POLYPROPYLENE OR POLYETHYLENE

[75] Inventors: Tai-Shung Chung, Randolph; Edward R. Kafchinski, Winfield; Frank Haimbach, IV, Upper Montclair, all of N.J.

[73] Assignee: Hoechst Celanese Corp., Somerville, N.J.

[21] Appl. No.: 896,944

[22] Filed: Jun. 11, 1992

Related U.S. Application Data

[63] Continuation-in-part of Ser. No. 870,526, Apr. 17, 1992.

[51] Int. Cl.$^5$ .................. B32B 27/08; B05D 3/12; B21F 9/00; D06C 3/00
[52] U.S. Cl. .................. 428/515; 427/171; 427/379; 427/412.3
[58] Field of Search ........... 427/171, 379, 412.3; 428/515

[56] References Cited

U.S. PATENT DOCUMENTS

| | | | |
|---|---|---|---|
| 3,483,273 | 12/1969 | Prucnal et al. | 260/878 |
| 3,860,442 | 1/1975 | Natta et al. | 117/76 T |
| 4,081,424 | 3/1978 | Gergen et al. | 260/42.18 |
| 4,107,130 | 8/1978 | Gergen et al. | 260/40 R |
| 4,110,303 | 8/1978 | Gergen et al. | 260/42.18 |
| 4,455,273 | 6/1984 | Harpell et al. | 264/184 |
| 4,584,347 | 4/1986 | Harpell et al. | 525/119 |

*Primary Examiner*—Bernard Pianalto
*Attorney, Agent, or Firm*—M. W. Ferrell

[57] ABSTRACT

A process for coating a polypropylene or polyethylene surface with a maleic acid-grafted polypropylene or polyethylene copolymer, and stretching the surface to increase permeability without damaging the coated surface. In this process, a dope containing the graft copolymer is applied to the polypropylene or polyethylene surface, e.g. by dip coating, at a temperature high enough to keep the copolymer solvated in the dope solvent; the surface is then dried. The permeability of the surface is improved by stretching the surface at least about 50% beyond its original area or length such that when the stretching force is released a residual strain of less than about 11% exists. The stretching operation may be done simultaneously with or subsequent to the coating operation.

20 Claims, 1 Drawing Sheet

PROCESS FOR SURFACE-MODIFYING POLYPROPYLENE OR POLYETHYLENE

This application is a continuation-in-part of U.S. application Ser. No. 870,526 filed Apr. 17, 1992.

BACKGROUND OF THE INVENTION

This invention relates to a process for modifying the surface of polypropylene or polyethylene to improve surface adhesion properties, especially to a process for bonding a maleic acid-polypropylene or polyethylene graft copolymer to polypropylene or polyethylene.

Polypropylene and polyethylene are common, relatively inexpensive, polymers used in fibers, films, and other articles. They have many useful properties, but are difficult to blend with or bond to other polymers. As a rule, these polymers do not readily adhere to other polymers. CELGARD ® polypropylene fiber (made by Hoechst Celanese Corp., Charlotte, N.C.) is an example of a commercial polypropylene fiber.

Block and graft copolymers are often used as compatibilizers. See, e.g., U.S. Pat. Nos. 3,483,273, 3,860,442, 4,081,424, 4,107,130, and 4,110,303, the disclosures of which are herein incorporated by reference.

Polyolefins having functional monomers grafted thereon are known in the art. Acrylic acid grafted polypropylene, for instance, is produced by BP Chemicals, which sells this polymer as part of its POLYBOND ® product line. This product is used as a reactive compatibilizer for preparing polypropylene-polyester and polypropylene-polyamide blends. However, acrylic acid grafting causes polyolefins to degrade significantly, reducing the intrinsic viscosity, molecular weight, and other properties of the polymer. Graft copolymers of this type are disclosed in U.S. Pat. Nos. 4,455,273 and 4,584,347, the disclosures of which are herein incorporated by reference.

Hoechst Celanese Corporation makes HOSTAPRIME ® HC 5, a maleic anhydride-grafted low molecular weight polypropylene coupling agent. Maleic anhydride grafted polyolefins are also available from BP Chemicals under the POLYBOND ® tradename. These products are used in polymer blends to improve the compatibility of blended polymers, e.g. in polypropylene-polyamide blends.

Pending U.S. patent application No. 622,563, filed Dec. 5, 1990, describes a graft copolymer comprising a polyolefin backbone or main chain, preferably polypropylene, having muconic acid groups pendant therefrom. The acid groups are bonded to the backbone of the polyolefin by free radical addition across a muconic acid double bond.

SUMMARY OF THE INVENTION

The present invention is a process for modifying a polypropylene or polyethylene surface, including coating with a graft copolymer comprising maleic anhydride- or maleic acid-grafted polypropylene or polyethylene, said process comprising applying a dope containing said copolymer to said surface, stretching said surface, and drying said surface. The surface is stretched at least about 50% of its original length in a manner that will produce no more than about an 11% residual strain. The process of this invention produces a porous copolymer coating bonded to said surface. The coated product has superior adhesion characteristics compared to uncoated polypropylene or polyethylene, and superior permeability compared to an unstretched coated product.

The temperature of the coating process is important. The dope must be hot enough to keep the copolymer dissolved in the dope solvent until the copolymer bonds to the surface.

It is an object of the present invention to provide a process for coating polypropylene or polyethylene with a graft copolymer.

It is another object of the present invention to provide a process for modifying the surface of polypropylene or polyethylene to improve its adhesion characteristics.

It is a further object of the present invention to provide a polypropylene or polyethylene which is coated with a graft copolymer comprising polypropylene or polyethylene and maleic acid or anhydride units and has good permeability.

It is an additional object of the present invention to provide a CELGARD ® polypropylene fiber having improved adhesion characteristics and good oxygen permeability.

Other objects and advantages of the present invention will be apparent to those skilled in the art from the following description and the appended claims.

DETAILED DESCRIPTION OF THE PREFERRED EMBODIMENTS

Figure 1:
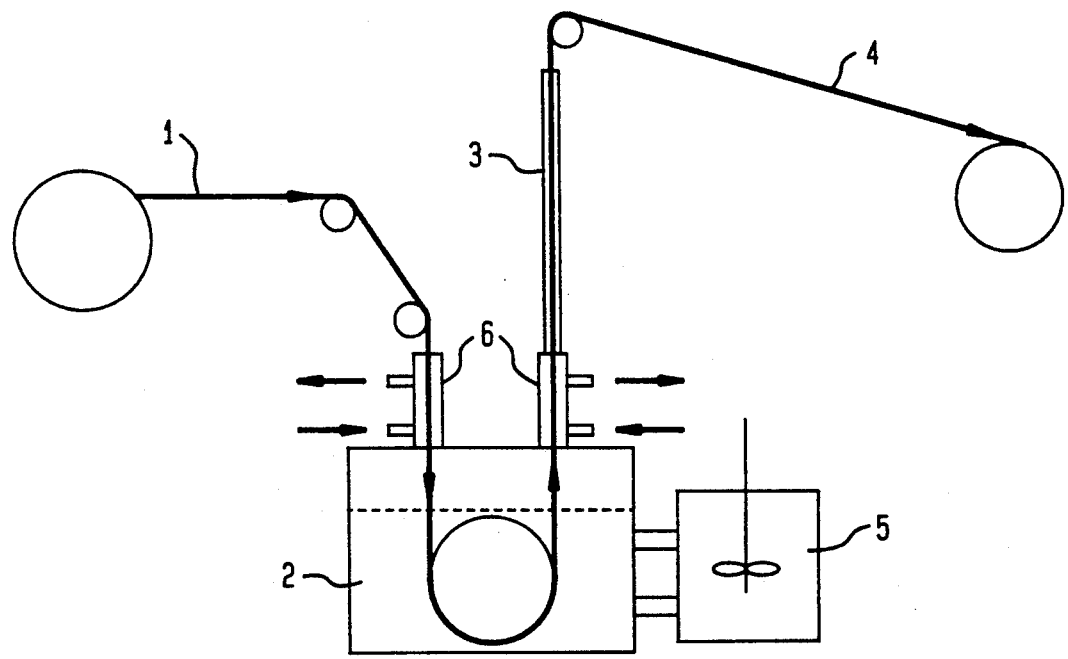
FIG. 1 illustrates one embodiment of a process according to the present invention.

In one preferred embodiment of the present invention, a CELGARD ® polypropylene fiber (made by Hoechst Celanese Corp., Charlotte, N.C.) is coated with HOSTAPRIME ® HC 5 maleic anhydride grafted low molecular weight polypropylene (made by Hoechst Celanese Corp., Charlotte, N.C.; melting point about 153°–159° C.), having at least about 4% by weight maleic acid content, according to the following procedure.

A dope is made by dissolving the HOSTAPRIME ® HC 5 copolymer powder in a solvent that is 80% xylene and 20% toluene by wt. at a temperature of at least about 100° C. to make a dope having about 2–15% solids content by weight, preferably about 3–10%. As illustrated in FIG. 1, the CELGARD ® polypropylene fiber 1 is passed through this dope 2 at a temperature of about 90°–110° C., preferably about 90°–100° C. After the fiber 1 passes through the dope 2 it is dried in a drying apparatus 3 at about 100°–140° C. until substantially all the solvent has vaporized, producing a coated fiber 4. A mixing unit 5 helps maintain the dope at a uniform temperature.

Cooling condensers or water jackets 6 serve to prevent solvent evaporation from the dope 2. These condensers do not touch the fiber 1, and must not cool the fiber 1 enough to cause complete precipitation of the polymer. The optimum temperature of the water or other coolant passing through the condensers 6 will depend on the system parameters, e.g., fiber speed, condenser dimensions, solvent, dope temperature, and the like. Typically, the water at a temperature of about 10°–20° C. is used.

A tension force is applied to stretch or strain the fiber 1 by at least 50% of its length after the fiber 1 is dried. The fiber 1 is not stretched beyond the point where the residual strain would exceed 11% of the original length.

The residual strain is the permanent increase in the length of the fiber 1 that remains after the tension force is released.

The thickness of the coating may be varied as desired by controlling the solids content of the dope, and the residence time of the fiber in the dope bath (e.g., the fiber speed as it passes through, the length of the path the fiber travels in the dope bath, etc.). Generally, the thickness of the coating is about 0.1–25 microns, preferably about 0.5–10 microns.

To achieve a strong bond between the copolymer and the polypropylene fiber, it is necessary to maintain the dope at a sufficient temperature until the solvent vaporizes so that the copolymer will not prematurely precipitate; premature precipitation as the fiber passes through and/or exits the dope bath leads to poor adhesion of the copolymer to the polypropylene. This is often a problem where there is a gap between the dope bath and the drying section of the apparatus, since the dope-coated fiber will cool below the coating temperature while passing through the gap. For example, the copolymer could be stable in the solvent at a temperature of about 70° C. but using such a temperature has been found to cause the copolymer to precipitate rapidly and adhere poorly where a gap of about 20 mm exists between the dope and the drying apparatus. The lowest practical temperature that may be used will depend upon many factors, which may include: the solids content of the dope; the particular solvent and copolymer used in the dope; the air gap, if any, between the dope and the drying apparatus; the fiber tension; and the speed of the fiber.

The temperature must never be high enough to cause any damage or decomposition of the fiber or the copolymer, nor to reach the boiling point of the solvent. However, it must be high enough to keep the copolymer in solution. Generally, a dope bath temperature of about 85°–110° C. is suitable, preferably about 90°–105° C. The drying column temperature should be at least as high and may be slightly higher, e.g. about 90°–150° C., preferably about 100°–130° C. The optimal temperatures for a given embodiment of the present invention depend on several variables, including the coating thickness, the coating speed, and the solid content of the dope.

The dope solvent may be any suitable solvent having one or more components which is capable of dissolving the copolymer, does not cause undesirable reactions, and is easily vaporized at a temperature low enough to avoid damaging the polypropylene or copolymer. Organic solvents having low polarity are preferred. Xylene and toluene are useful for this purpose, and mixtures of these solvents have been found to be very good solvents in the process of the present invention. Preferably, the solvent comprises about 30–100% xylene and about 0–70% toluene.

The fiber is stretched to enhance its permeability, e.g., to gases such as oxygen and the like. However, it must not be stretched so severely that the fiber is damaged. It has been found that the maximum amount of stretching that is allowable according to the present invention depends on the stretching temperature, force and speed; however, whenever the stretching causes a residual strain in excess of about 11% undesirable fiber damage occurs, i.e., the fiber surface becomes cracked. When the residual strain is less than about 11%, the stretched fiber has a uniform coating with enhanced permeability.

The stretching operation may be done either at room temperature or at an elevated temperature, e.g., in an oven. Typically, the stretching temperature is in the approximate range of 25°–150° C., preferably about 50°–125° C. Although in the preceding embodiment the fiber is stretched after it is dried, it is also within the scope of the present invention to stretch the fiber during the coating process, or as part of the drying operation.

The stretching rate and tension force may be varied. For example, a stretch rate of about 100%/minute is suitable, but faster and slower rates also may be used. The tension force must be sufficient to achieve the desired stretch; the minimum force needed will depend on the fiber being stretched and the other stretching conditions. Those skilled in the art will be able to determine a suitable stretch rate and tension force without undue experimentation.

Although commercial polypropylene hollow fiber and copolymer have been used in the above embodiment, any polypropylene or polyethylene fiber, film, or other article that is capable of being stretched may be coated by this process, and many similar maleic acid-grafted copolymers may be used. The copolymer should contain about 0.5–10% by wt. of units derived from maleic acid, and a melting point of about 140°–190° C. These copolymers may be made by conventional methods for forming graft copolymers, e.g., by free radical addition of the maleic moiety to the polymer chain. The starting material for making such copolymers may include either maleic acid or maleic anhydride, or other maleic acid derivatives; the term "maleic acid-grafted" used herein encompasses all such copolymers. The chemical structure of these copolymers may be represented by the following:

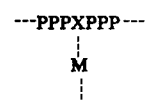

where P represents a repeating polymer chain unit, M represents the maleic moiety, and X is the polymer unit to which M is bonded.

Where the surface to be coated and stretched is not a fiber, but a film or other article, the surface may be stretched in a single direction, or in more than one direction, e.g. biaxially stretching a film. If the surface is stretched in more than one direction, the surface should be stretched at least about 50% its original area and the residual strain should not exceed about 11% of the original surface area.

The stretched surface may be annealed in an oven to stabilize the surface structure. The annealing time may vary from a few seconds to hours. Preferably, the surface is annealed for from about 30 seconds to about one hour, more preferably from about one minute to about one hour. Suitable annealing temperatures include the temperatures that are suitable for stretching, e.g., approximately 25°–150° C., preferably about 50°–50° C.

The surface-modified polypropylene or polyethylene obtained by the process of the present invention may be subsequently coated with another layer of material, e.g., another polymer, a layer of material useful for fluid separations, an abrasion-resistant layer, or any other desirable coating. The copolymer coating enhances the bonding of such subsequent coatings to the polypropylene or polyethylene article. These coatings may be applied by any means known in the art.

The following non-limiting examples illustrate several embodiments of the present invention. However, these Examples are only intended as illustrative, and the scope of the present invention is not limited to the embodiments illustrated herein; the scope of the present invention encompasses the entire subject matter covered by the appended claims.

EXAMPLE I

HOSTAPRIME® HC 5 maleic anhydride-grafted polypropylene was dissolved in an 80/20 (w/w) xylene/toluene solvent at 107°–115° C. with stirring in an amount calculated to achieve a dope solution comprising 10% HOSTAPRIME by weight. This dope remained stable at 100° C.

The dope was placed in a container or reservoir that was temperature controlled and almost completely sealed. CELGARD® polypropylene fibers (m.p. about 180°–190° C.) were coated with the dope (103° C.) by passing the fiber through this dope reservoir at speeds of 3 and 6 meters/min. The fiber passed out of the reservoir and into a heated drying column (105° C.) where the solvent was driven off. Condensers maintained at 16° C. were located at the reservoir openings, e.g., between the reservoir and the drying column. The air gap between the condensers and the drying column was 3–5 cm. A tension force was applied using a 50 gram weight.

Table I summarizes the results, showing the effect of coating speed on fiber permeance. The permeances were measured at an oxygen pressure of 20 psi; the sample length was 6 cm. For comparison, data on uncoated CELGARD® fiber is also included.

TABLE I

| Coating Speed (M/min) | Permeance (O$_2$ cm$^3$/min) | Fiber Denier (g/9000M) |
|---|---|---|
| 6 | 2.1 | 161 |
| 3 | 4.8 | 147 |
| Uncoated CELGARD | 60–70 | 151 |

SEM (Scanning Electron Microscopy) pictures revealed that both coated fibers have 3-dimensional interconnected porous surface structures. The higher permeance of the 3 M/min fiber can be attributed to greater stretching, as evidenced by the lower denier, due to a longer residence time in the coating apparatus.

EXAMPLE II

Fibers were prepared according to Ex. I at a coating speed of 3 M/min. After the fibers were coated and dried, they were stretched to varying degrees at room temperature (about 23° C.) and a stretch rate of 100%/min. As in Ex. I, the oxygen permeance at 20 psi of 6 cm lengths of fiber were measured and the fibers were studied by SEM. The results are in Table II.

TABLE II

| Stretch (%) | O$_2$ Perm. (cm$^3$/min) | SEM Remarks |
|---|---|---|
| 0 | 4.8 | 3-D interconnected particles; uniform distribution |
| 50 | 8–11 | same as above |
| 75 | 16–25 | same as above |
| 100 | 23–42 | visible crack |
| 125 | 34–38 | |
| 150 | 25–35 | distorted 3-D porosity; highly |

TABLE II-continued

| Stretch (%) | O$_2$ Perm. (cm$^3$/min) | SEM Remarks |
|---|---|---|
| | | cracked surface |

EXAMPLE III

Coated fibers were prepared as in Ex. II, except that the stretching was done in a temperature-controlled oven at various temperatures. After stretching, the fiber was annealed in the oven at the stretching temperature for one minute. Elevated temperatures generally proved to reduce the residual strain; it appears that elevated temperatures reduce fiber damage due to high speed stretching. SEM data showed no significant change in the surface structure where the residual strain was less than 11%. The residual strain results are presented in Table III.

TABLE III

| Residual Strain (%) at Various Stretching Temperatures | | | | |
|---|---|---|---|---|
| Stretch | 25° C. | 50° C. | 75° C. | 100° C. |
| 50 | 3.33 | 4–5 | 4–5 | 5 |
| 75 | 6.5–9 | | | |
| 100 | 15–18 | 10–11 | 7.5 | 10 |
| 125 | 25–30 | | | |
| 150 | 34–37 | 23–25 | 11–15 | 13–20 |

Many variations and equivalents of the present invention will occur to those skilled in the art. The present invention is not limited to the embodiments illustrated or described, but includes all the subject matter within the spirit and scope of the appended claims and of the foregoing disclosure.

We claim:

1. A process for modifying an article surface having an area, said article comprising polypropylene or polyethylene, said process comprising:
   coating said surface with a dope, said dope comprising a copolymer and a solvent, at a coating temperature sufficient to keep said copolymer dissolved in said solvent, wherein said copolymer comprises a maleic acid-grafted polypropylene or polyethylene copolymer;
   drying said coated surface at a drying temperature sufficient to vaporize said solvent which drying temperature is at least as high as said coating temperature; and,
   stretching said surface to at least about 50% more than said surface area without causing a residual strain of more than about 11% of said area,
   wherein the temperature of said dope is not allowed to fall below that needed to keep said copolymer dissolved in said solvent prior to drying.

2. A process according to claim 1 wherein said coating temperature is at least about 85° C.

3. A process according to claim 2 wherein said coating temperature is about 90°–110° C.

4. A process according to claim 1 wherein said drying temperature is at least about 90° C.

5. A process according to claim 4 wherein said drying temperature is about 100°–130° C.

6. A process according to claim 1 wherein said dope has a copolymer content of about 2–15% by weight.

7. A process according to claim 1 wherein said solvent comprises toluene and xylene.

8. A process according to claim 1 wherein said polypropylene or polyethylene surface is the surface of a polypropylene or polyethylene fiber.

9. A process according to claim 1 wherein said stretching is carried out subsequent to said drying.

10. A process according to claim 1 wherein said stretching is carried out simultaneously with said coating and prior to said drying.

11. A process according to claim 1 wherein said stretching is carried out at a temperature in the approximate range of 50°–125° C.

12. A process according to claim 1 further comprising coating another polymer over said copolymer after said drying and said stretching are completed.

13. An article made according to the process of claim 12.

14. A process according to claim 1 further comprising, following said stretching, annealing said surface for from about 30 seconds to about one hour at a temperature of from about 50° C. to about 150° C.

15. A process for modifying a surface of a fiber comprising polypropylene or polyethylene, said process comprising:

coating said surface with a dope, said dope comprising a copolymer and a solvent, at a coating temperature sufficient to keep said copolymer dissolved in said solvent, wherein said copolymer comprises a maleic acid-grafted polypropylene or polyethylene copolymer;

drying said coated surface at a drying temperature sufficient to vaporize said solvent, wherein said drying temperature is at least as high as said coating temperature; and, stretching said fiber lengthwise by at least about 50% without causing a residual strain of more than about 11%, said stretching being done at a temperature in the approximate range of 25°–150° C., wherein the temperature of said dope is not allowed to fall below that needed to keep said copolymer dissolved in said solvent prior to drying.

16. A process according to claim 15 wherein said stretching is carried out simultaneously with said coating and prior to said drying.

17. A process according to claim 15 wherein said stretching is carried out subsequent to said drying.

18. A process according to claim 15 further comprising coating another polymer over said copolymer after said drying and said stretching are completed.

19. An article made according to the process of claim 18.

20. A process according to claim 15 wherein said stretching is carried out at a temperature in the approximate range of 50°–125° C.

* * * * *